United States Patent [19]
Dawson

[11] Patent Number: 5,079,869
[45] Date of Patent: Jan. 14, 1992

[54] WEIGHT-RESPONSIVE HANGER

[76] Inventor: Fountain E. Dawson, 4008 Bunker Hill Rd., Cottage City, Md. 20722

[21] Appl. No.: 570,452

[22] Filed: Aug. 21, 1990

[51] Int. Cl.⁵ .............................................. A01G 9/02
[52] U.S. Cl. ......................................... 47/67; 248/339
[58] Field of Search ................ 47/67; 177/245, 246; 248/300, 339, 324, 914

[56] References Cited

U.S. PATENT DOCUMENTS

| | | | |
|---|---|---|---|
| 314,801 | 3/1885 | Clausen | 177/245 |
| 1,367,972 | 2/1921 | Hyde. | |
| 2,738,188 | 3/1956 | Hoffman | 248/914 |
| 2,951,673 | 9/1960 | Critcher. | |
| 3,599,738 | 8/1971 | Wickerberg | 177/126 |
| 3,967,578 | 7/1976 | Gallo. | |
| 3,967,578 | 7/1976 | Gallo | 47/67 |
| 4,078,625 | 3/1978 | Loeb. | |
| 4,210,302 | 7/1980 | Serkez | 248/914 |
| 4,449,324 | 5/1984 | Ostarly. | |
| 4,480,465 | 11/1984 | Chase. | |
| 4,760,666 | 8/1988 | Han. | |

FOREIGN PATENT DOCUMENTS

| | | | |
|---|---|---|---|
| 422327 | 9/1924 | Fed. Rep. of Germany | 177/126 |
| 506650 | 6/1939 | United Kingdom | 177/126 |

*Primary Examiner*—Henry E. Raduazo
*Attorney, Agent, or Firm*—David H. Semmes

[57] ABSTRACT

Suspension or hanger bars, particularly a weight-responsive hanger bar which is pivotable to indicate changes in weight of the suspended object. The device is particularly adaptable to suspension of moisturized planters, such that the hanger bar is pivoted, as the moisture content of the planter is depleted.

8 Claims, 3 Drawing Sheets

WEIGHT-RESPONSIVE HANGER

BACKGROUND OF THE INVENTION

1. Field of the Invention

Suspension bars or hangers, particularly a weight-responsive hanger for moisturized plants and the like. As the moisture content of the suspended plant is depleted, the hanger pivots as an indicator of moisture loss.

2. Description of the Prior Art

Hyde: U.S. Pat. No. 1,367,972
Critcher: U.S. Pat. No. 2,951,673
Gallo: U.S. Pat. No. 3,967,578
Loeb: U.S. Pat. No. 4,078,625
Ostarly: U.S. Pat. No. 4,449,324
Chase: U.S. Pat. No. 4,480,465
Han: U.S. Pat. No. 4,760,666

The prior art is replete with intricate devices for disclosing the moisture content of a suspended plant. However, there is no suggestion of a simple and inexpensive hanger for plants which pivots in response to weight loss and thereby visually indicates the depletion of moisture in the suspended plant.

SUMMARY OF THE INVENTION

According to the present invention, a plant hanger is devised to consist of an elongated hanger bar having an indicator end and a suspension end with an inclined slot defined intermediate the ends. A hook bar having a base end and a lower suspension end, is complementally fitted within the slot of the hanger bar such that the lower suspension end extends beneath the hanger bar suspension end. A wire, toggle, or the like, may be employed to suspend the elongated hanger bar at its suspension end and a wire, or the like, may be used to suspend a plant hanger, or the like, from the suspension end of the hook bar. As the weight of the suspended object is depleted, the hanger bar pivots from the horizontal as an indicator of weight change. Thus, as moisture is depleted from the plant, the pivoting hanger bar signals the necessity for re-watering the plant.

DESCRIPTION OF THE PREFERRED EMBODIMENTS

Figure 1:
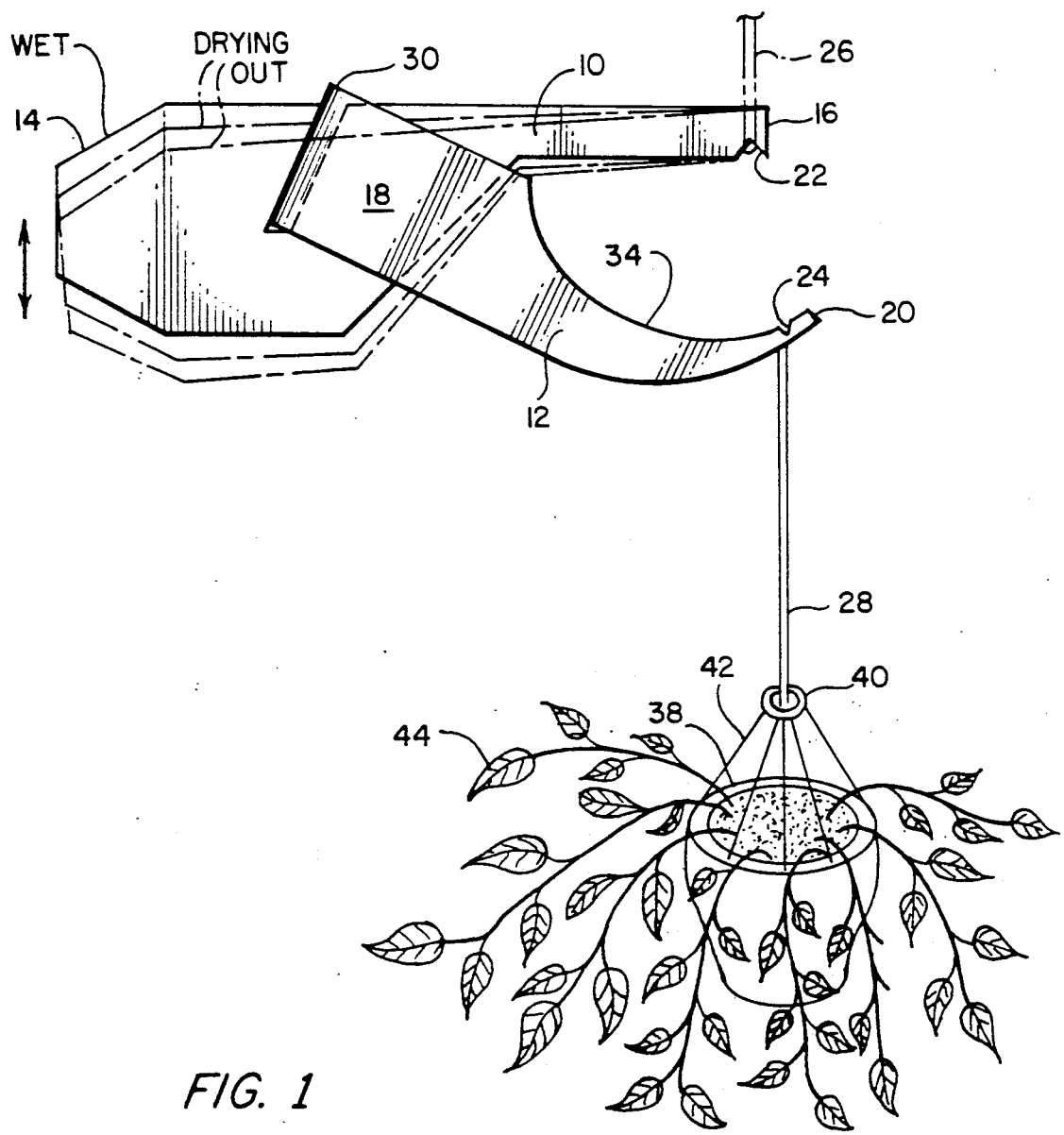
FIG. 1 is a side elevation of the hanger bar with the complementally fitting hook bar suspending a plant hanger.
Figure 2:
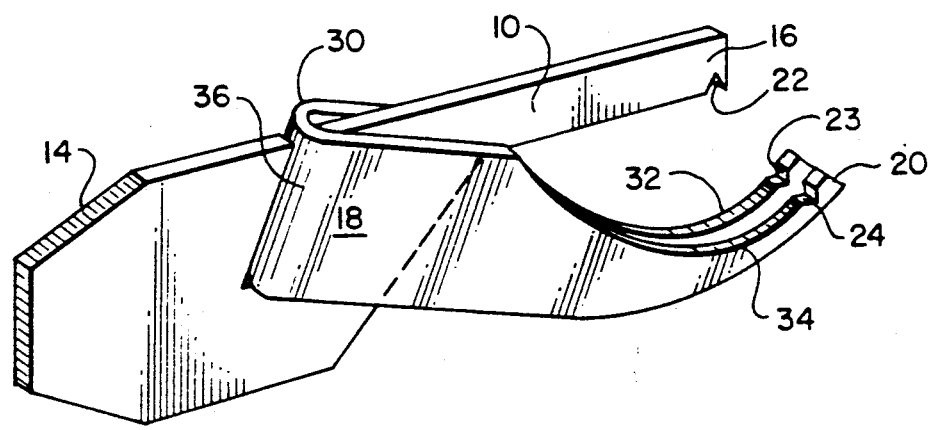
FIG. 2 is a perspective view of the hanger bar and hook bar.
Figure 3:
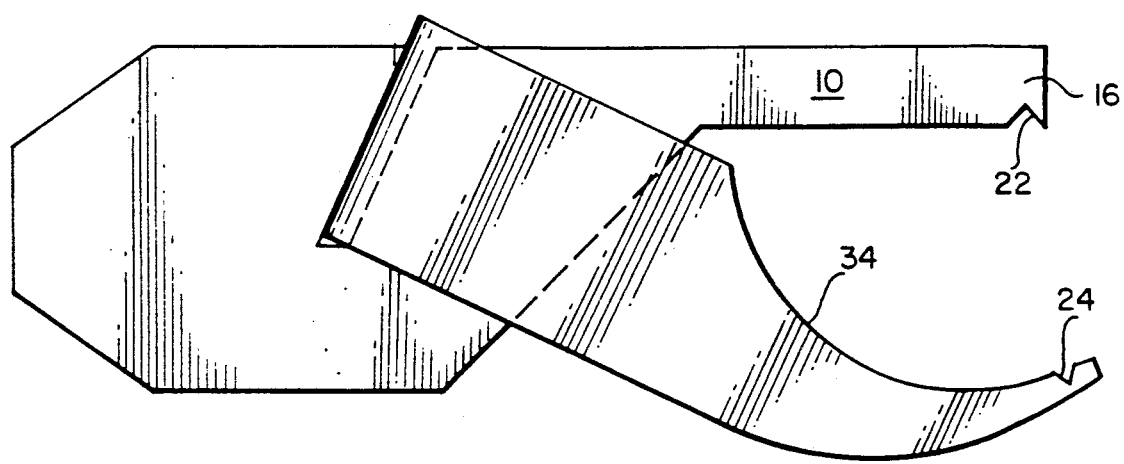
FIG. 3 is a side elevation thereof.
Figure 4:
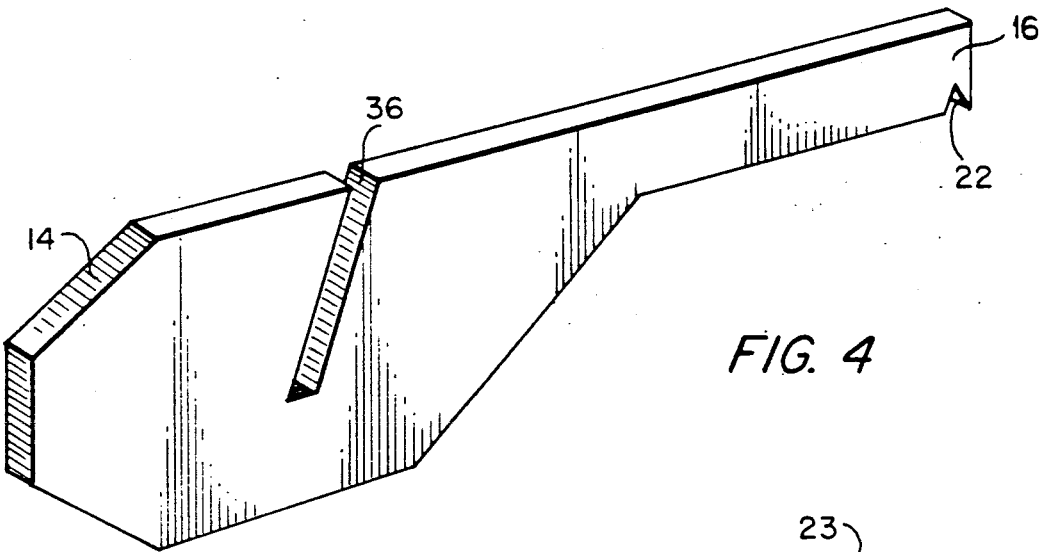
FIG. 4 is a perspective view of the hanger bar with its inclined slot intermediate its indicator end and suspension end.
Figure 5:
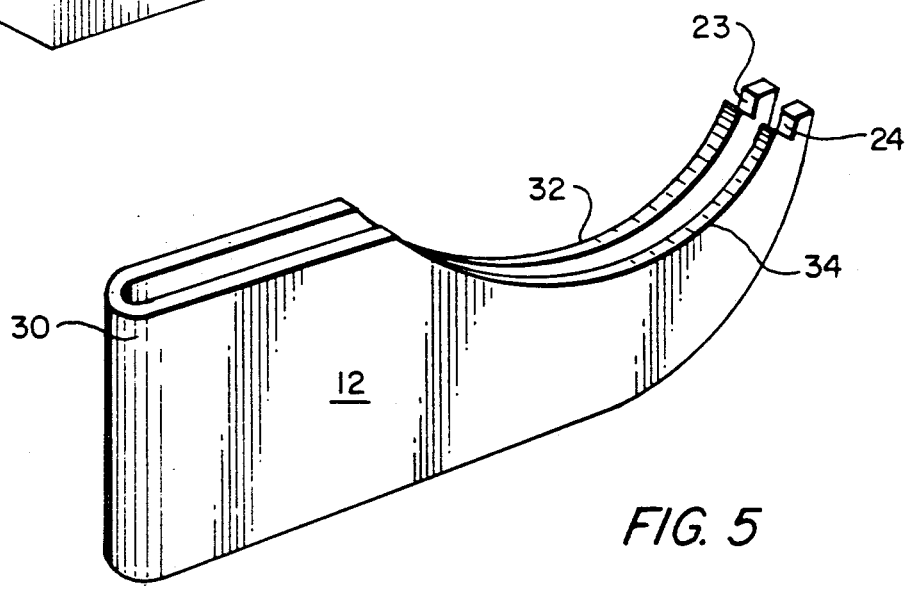
FIG. 5 is a perspective view of the bifurcated hook bar.
Figure 6:
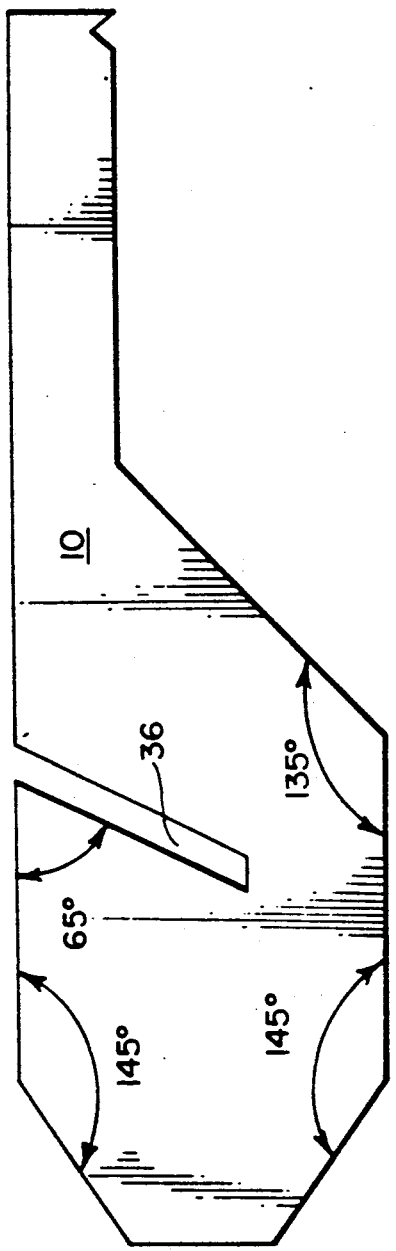
FIG. 6 is a side elevation of the suspension bar and indicating suggested dimensions.
Figure 7:
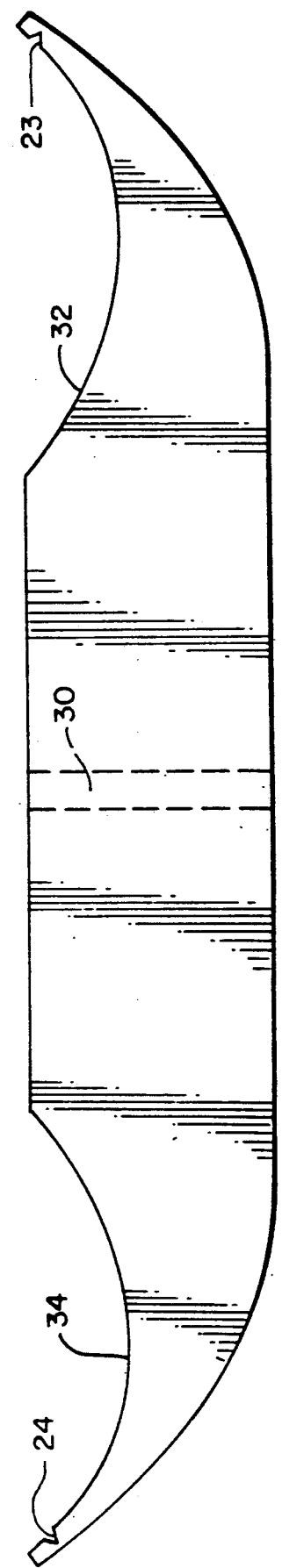
FIG. 7 is a front elevation of the hook bar, prior to its being bent into the bifurcated form shown in FIG. 5, and indicating suggested dimensions.

In FIG. 1 the weight-responsive hanger is illustrated as comprising an elongated and horizontally extending hanger bar 10 having an indicator end 14 and a suspension end 16. A bifurcated hook bar 12 is shown as having its base end 18 complementally fitted as at 30 within inclined slot 36.

Hanger bar 10 suspension end 16 may have one or more notches 22 in its lower surface for engaging a suspension wire, toggle, or the like, 26 (illustrated in phantom).

The bifurcated ends 32, 34 of hook bar 12 may include notches 24, 23 defined in the upper surface for engaging a suspending wire or thread 28, or the like.

A plant hanger 38 supporting plant 44 may be suspended conventionally from wire 28 by means of clasp 40 and radially extending support lines 42. As indicated by phantom lines in FIG. 1, the indicator end 14 of hanger bar 10 pivots downwardly as the weight in the suspended object or planter 38 is reduced. Thus, as moisture content in planter 38 is depleted, hanger bar indicator end 14 will pivot downwardly.

In FIG. 1 the hanger indicator end is shown in bold line substantially horizontal with respect to the moisturized planter 38. Successive stages of drying out of planter 38 are indicated by phantom line indicator end 14. As will be apparent, hanger bar 10 thus serves as an effective moisture gauge, eliminating the necessity for complex hygroscopic testing and visual indicators. The entire suspended assembly is weight-responsive in that as the weight of the suspended object 38 is reduced, the center of gravity of the hanger is moved laterally away from the suspension end 16 of the hanger bar. This moving of the center of gravity causes the pivoting of hanger bar 10 as an indicator of weight, or moisture loss. Manifestly, the hanger bar and hook bar may be variously configured and various substitutes for "wire", for example, thread, line, chain, toggles, braid or the like, may be similarly employed without departing from the spirit of invention.

I claim:

1. A weight-responsive hanger comprising:
   a. an elongated hanger bar having an indicator end and a suspension end with an inclined slot defined in a mid-portion intermediate said indicator end and said hanger end, and
   b. a hook bar having a base end complementally fitted within said slot of said hanger bar and a lower suspension end extending beneath said hanger bar suspension end, said hook bar being folded at its base end to define a wrap-around engagement with said inclined slot and at its hook end defining a bifurcated support for said hanger; and c. an upper suspension wire engaging said hanger bar suspension end and a lower suspension wire engageable with a moisturized planter suspended from said hook bar lower suspension end, such that said hanger bar pivots from the horizontal as the moisture content of the planter varies.

2. A weight-responsive plant hanger as in claim 1, said hook bar being folded at its base end to define a wrap around engagement with said inclined slot and at its hook end defining a bifurcated support for a suspended object.

3. A weight-responsive plant hanger as in claim 1, said elongated hanger bar indicator end being horizontally balanced when the suspended object is moisture laden and pivotable downwardly proportionately to a reduction in moisture content of said planter.

4. A weight-responsive plant hanger as in claim 3, said hanger bar suspension end including a notch cut in its lower side so as to be engagable with said upper suspension wire.

5. A weight-responsive plant hanger as in claim 4, said hook bar suspension end including a notch defined in its upper surface as a support for said lower suspension wire.

6. A weight-responsive plant hanger as in claim 5, wherein the center of gravity of said elongated hanger bar and said hook bar is moved laterally, as the weight of the suspended object is varied.

7. A weight-responsive plant hanger as in claim 6, wherein the center of gravity of said hanger bar is moved laterally away from said suspension end, as weight of the suspended object is reduced.

8. A weight-responsive plant hanger as in claim 6, wherein the center of gravity is moved laterally away from said suspension end accordingly as moisture content is reduced in the suspended object.

* * * * *